United States Patent [19]

Salemme

[11] 3,933,993

[45] Jan. 20, 1976

[54] USE OF CONCENTRATED CHELATED IRON REAGENT FOR REDUCING POLLUTANT CONTENT OF A FLUID

[75] Inventor: Robert M. Salemme, Schenectady, N.Y.

[73] Assignee: General Electric Company, Schenectady, N.Y.

[22] Filed: June 28, 1974

[21] Appl. No.: 484,216

[52] U.S. Cl. .............. 423/573; 423/226; 423/243
[51] Int. Cl.² .................. C01B 17/04; B01D 53/34
[58] Field of Search ......... 423/210, 220, 224, 226, 423/571, 243, 573 L

[56] References Cited
UNITED STATES PATENTS 3,097,925  7/1963  Pitts, Jr. et al..................... 423/226

3,226,320  12/1965  Meuley et al................... 423/224 X

FOREIGN PATENTS OR APPLICATIONS 948,270  1/1964  United Kingdom............... 423/226

*Primary Examiner*—Earl C. Thomas
*Attorney, Agent, or Firm*—Leo I. MaLossi; Joseph T. Cohen; Jerome C. Squillaro

[57] ABSTRACT

A chelated iron solution of high concentration that is stable at a pH greater than 7 to at least pH 10 is disclosed. Also a process is disclosed in which this formulation is used to remove $H_2S$ and/or mercaptans as pollutants in a gas stream. In the case of $H_2S$ this chelate acts by producing sulfur therefrom in the absence of oxygen.

9 Claims, No Drawings

USE OF CONCENTRATED CHELATED IRON REAGENT FOR REDUCING POLLUTANT CONTENT OF A FLUID

U.S. Pat. No. 3,226,320 — Meuley et al is directed to the use of chelated polyvalent metal salt solutions as catalysts for the oxidation of hydrogen sulfide and/or mercaptans present in fluid streams. The chelate is to be added to the polluted stream and, thereafter, this mixture is contacted with gaseous oxygen. The amount of chelate added to the pollutant stream is to be "an amount that is stoichiometrically substantially less than the amount of the pollutant" (Meuley et al column 1, lines 32 through 38).

Although there is no discussion thereof in the Meuley et al patent, because of this teaching that the concentration of metal chelate in the polluted steam/ chelate solution is to be kept very low, the metal chelate present would quickly be converted to the lower valence form, if oxygen were not simultaneously fed to the system. In the lower valence form, the chelate would no longer function to destroy the specific pollutant concentrations in the fluid stream.

It would be of advantage to be able to eliminate this requirement for the addition of an oxygenating gas to the fluid stream being treated. It is to the solution of this problem that the instant invention is directed.

DESCRIPTION OF THE INVENTION

A chelated iron solution of high concentration that is stable at a pH greater than 7 to at least pH 10 is disclosed. Also a process is disclosed in which this formulation is used to remove $H_2S$ and/or mercaptans pollutants from a gas stream in the absence of oxygen. The term "gas" includes both gas and "vapor" as employed herein.

MANNER AND PROCESS OF MAKING AND USING THE INVENTION

In addition to overcoming the requirement that oxygen be fed into the fluid stream being treated with a chelated ferric iron solution, this invention also permits more efficient design of the mass transfer equipment employed in such treatment.

Although, by way of example, the description given herein of this invention is directed to the removal of hydrogen sulfide from fluid streams, the process of this invention is equally applicable to the removal of mercaptans. Thus, for example, alkyl mercaptans would be oxidized by this process to dialkyl disulfides, which are water-insoluble oils.

Thus, in this invention a multi-step process is employed in the first (absorption) step of which a stream of $H_2S$-containing fluid is brought into contact with concentrated chelated ferric iron solution of high pH. The reaction schematically illustrating consumption of the $H_2S$ for the production of sulfur therefrom is shown as follows:

  (1)

As will be noted, no sulfur dioxide (or $SO_x$ compounds) or iron sulfide is formed. Sulfur removal, the next step, is relatively simple, e.g. by filtration, centrifugation.

The rest of the reaction products (sulfur-free) are then directed to the regeneration step in which the chelate material is subjected to oxidation (preferably by air), for reconditioning to the ferric state. After completion of the regeneration step, the refurbished chelate composition is ready for reaction with more of the pollutant content of the fluid stream being treated.

Conduct of this process is particularly applicable to the removal of $H_2S$ from a gas, or vapor, stream, e.g. as is produced by the gasification of coal. The gas stream from a coal gasifier contains hydrogen sulfide in a relatively small (about 1 ½% by volume) concentration. To remove this impurity, the flow of gasified coal is passed upwardly through a packed bed in countercurrent flow with liquid chelated ferric iron solution passing downwardly through the same packed bed. After absorption of the $H_2S$, reconditioning of the spent chelate solution is carried out. During the reconditioning step, oxygenating gas is passed upwardly through a second packed bed in countercurrent flow to the downwardly directed stream of spent liquid chelate (free of sulfur) from the absorption bed.

The two-step process of this invention, therefore, enables the use of different mass transfer equipment for the absorption step from that equipment utilized for the regeneration step. This is a particularly advantageous aspect of this invention since, given the option, the dimensional relationships of the absorber and regenerator will differ greatly. Thus, if both the absorber and regenerator utilize packed beds (e.g. of ceramic bodies), the packing height required for the regenerator would be about 10 times the packing height required for the absorber, because of the longer residence time required to properly regenerate the chelate. Further, it might be preferred to employ a Venturi scrubber to carry on the $H_2S$ absorption and to use a packed bed for the regeneration with oxygen.

Another advantage of this multi-step process is that, after treatment, the fluid stream is not contaminated with residuals from the oxygenating stream, such as excess oxygen or (in the case of air) nitrogen.

The regeneration of the chelate proceeds according to the schematic reaction:

  (2)

Because of the large scale of the fluid treatment proposed in the instant invention, iron and copper were the only polyvalent metals considered to be economical enough to employ in the preparation of the chelate. Of these, the iron chelate has been successfully employed, while the copper chelate was unable to convert the hydrogen sulfide to sulfur as desired. In the following examples $FeCl_3$ is used in the preparation of ferric chelates, however, other soluble ferric salts may be employed.

EXAMPLE 1

A concentrated chelated copper solution was prepared by adding 6.7 grams of $CuCl_2$ to 26 grams of ethylenediaminetetraacetic acid [EDTA $(Na)_4$]. The volume of the solution was brought up to 100 milliliters by the addition of distilled water. The pH of the resultant solution was 9.3. Hydrogen sulfide was bubbled into the solution and a brown precipitate was immediately produced. This precipitated material was not sulfur, but copper sulfide. Loss of copper from the system in this manner could not be tolerated.

EXAMPLE 2

A mixture of 30 grams $FeCl_3 . 6 H_2O$ and 70 grams of EDTA $(Na)_4$ was dissolved in 100 milliliters of water. The pH of this solution was adjusted up to about pH 10 with sodium hydroxide. This formulation provides an iron concentration of about 1 mole per liter with a ratio of EDTA to FeCl₃ of about 1.25. This concentrated chelate solution was stable and was successfully employed. A bubble column was filled with this solution. Pure H₂S gas was passed up through the column where it reacted to produce sulfur. The sulfur was separated from the reaction products and the spent ($Fe^{3+} \rightarrow Fe^{2+}$) solution was regenerated by contact with air in a second column. The regenerated chelated iron solution was successfully used in a repetition of the absorption step.

Various other bases other than sodium hydroxide can be employed for the adjustment of pH and, if desired, the chelated ferric iron solution can be buffered. Both phosphate and carbonate buffers have been used successfully.

EXAMPLE 3

2,000 ml of aqueous solution was prepared containing 1 mole of $FeCl_3$ and 1.5 moles of EDTA. The pH of the resulting ferric chelate solution was adjusted to 9.5 by the addition of $K_3PO_4$. $H_2S$ bubbled through the solution reacted to produce sulfur. The spent (ferrous) chelate solution was regenerated with air and the pH of the regenerated (ferric) chelate was 9.5 whereupon the solution was adjusted to pH 10 using $K_3PO_4$. The absorption step was then successfully repeated using the regenerated chelate solution.

EXAMPLE 4

2000 ml of aqueous solution was prepared containing 1 mole of $FeCl_3$ and 1.5 moles of EDTA. The pH of this ferric chelate solution was adjusted to pH 8.7 by the addition of $K_3PO_4$. As in the preceding example, the solution was successfully employed for adsorption, the spent solution was regenerated, was adjusted to pH 10 with $K_4PO_4$ and then was successfully used for further adsorption of $H_2S$.

EXAMPLE 5

2,000 ml of aqueous solution was prepared containing 1 mole of $FeCl_3$ and 1.25 moles of EDTA. The pH of this ferric chelate solution was adjusted to pH 8.5 using $Na_2CO_3$. As in Example 3, the solution was successfully employed for $H_2S$ absorption and the spent solution was regenerated with air. After adjustment of the regenerated solution to pH 10 with $Na_2CO_3$ the $H_2S$ absorption was successfully repeated therewith.

EXAMPLE 6

2,000 ml of aqueous solution was prepared containing 1 mole of $FeCl_3$ and 1.25 moles of EDTA. The pH of this ferric chelate solution was adjusted to pH 10 using $Na_2CO_3$. The boiling point of this solution was determined to be 111°C. $H_2S$ was bubbled through the chelate solution at 100°C and the adsorption reaction proceeded successfully. The pH was redetermined and was found to be pH 10.

It has been found that an excess of EDTA (i.e. the ratio of EDTA to Fe must be greater than 1:1 on a molar basis, e.g. more than 1 gm mole of EDTA per 1 gm mole of Fe) in order to provide the requisite sequestering action whereby iron is kept in solution. This was illustrated when a solution containing equi-molar quantities of EDTA and Fe was prepared and was employed for $H_2S$ absorption. Instead of forming sulfur, the reaction produced iron sulfide. The function of the EDTA is to keep the iron in solution. Thus, the more EDTA is present, the more iron complex (the solublizing mechanism for the iron) is maintained. The useable ratio of EDTA:Fe can extend from greater than 1:1 to greater than about 1.5:1. The preferred ratio of EDTA to Fe is about 1.5:1.

The useful range of pH is from pH greater than 7 to pH 10 with the preferred range being pH 9.0 - pH 10. This higher pH is preferred, because at higher values of pH the $H_2S \rightarrow S$ absorption improves significantly as long as this is accomplished by a high enough ratio of EDTA to Fe.

Further, although the concentration of iron in the ferric chelate solution is not critical (up to 1 mole of iron/liter), a concentration of about 0.5 moles of Fe/liter is preferred. The temperature of operation does not appear to be critical.

During regeneration the partial pressure of oxygen in the oxygenating gas is important to the kinetics of the regeneration. Thus, at low partial pressure of oxygen the requisite residence times for regeneration would be undesirably high.

A number of other chelating agents for iron have been investigated. Of the chelating agents set forth hereinbelow in Table 1, EDTA alone has proven successful. The other chelating agents failed as a) ferric hydroxide precipitated, when the solution was buffered to pH 10 or b) the solution did not convert hydrogen sulfide to sulfur, but rather to iron sulfide (probably $Fe_2S_3$).

TABLE 1

1. ethylenediaminetetraacetic acid (EDTA)
2. sodium gluconate
3. N-(carboxymethyl)-N'-2-hydroxyethyl-N-N'-ethylenediglycine
4. diethylenetriaminepentaacetic acid (DTPA)

BEST MODE CONTEMPLATED

The preferred formulation presents an iron concentration of about 0.5 moles per liter and a ratio of EDTA to Fe of about 1.5:1. Such a solution would be prepared and used as shown in Example 7 below.

EXAMPLE 7

135 gm $FeCl_3 \cdot 6H_2O$ was dissolved in water and 285 gm EDTA ($Na^+$)₄ was added. The solution volume was brought up to nearly 1 liter with distilled water. The pH of the solution was adjusted to slightly less than 10 by the addition of about 150 gm of $K_3PO_4$. The total solution was then made up to 1 liter providing an iron concentration of about 0.5 moles per liter and an EDTA concentration of about 0.75 moles per liter.

A 1 inch diameter column was packed with 7 mm Raschig rings to a depth of 1 foot. A test gas consisting of 1% by volume $H_2S$ with nitrogen constituting the balance was employed. The test gas was flowed upwardly through the packed column countercurrent to downward flow of the chelating iron formulation, the gas flow being 12 std. cubic feet per hour. The effect of temperature and pH on absorption efficiency was determined and is displayed in Tables 2 and 3 below. Absorption efficiency is defined as:

$$\frac{\text{inlet concentration } H_2S - \text{outlet concentration } H_2S}{\text{inlet concentration } H_2S}$$

Table 2

| Temp (°C) | (pH = 10) Absorption Efficiency (%) |
|---|---|
| 20 | 100 |
| 50 | 100 |
| 75 | 100 |
| 100 | 100 |

Table 2 illustrates that in varying the operating temperature from 20°C to 100°C there was no effect on absorption efficiency.

Table 3 set forth below indicates an increase in absorption efficiency by raising the pH from 7.5 to 10.

Table 3

| pH | (Temp. = 20°C) Absorption Efficiency (%) |
|---|---|
| 7.5 | ≈ 98 |
| 8.5 | ≈ 99.7 |
| 10 | 100 |

What I claim as new and desire to secure by Letters Patent of United States is:

1. A method for reducing the pollutant content of a gas stream wherein the pollutant is at least one member of the group of hydrogen sulfide and mercaptans, comprising the steps of:
   a. bringing the gas stream into intimate contact with an aqueous solution having a pH from greater than 7 to about pH 10 consisting essentially of water, a chelate of ferric iron with ethylenediaminetetraacetic acid (EDTA), and a buffering agent, said solution having a ratio of EDTA to Fe of greater than 1:1, the concentration of the Fe being at least about 0.5 moles per liter of the aqueous solution,
   b. separating insolubles from the reacted aqueous solution,
   c. bringing the reacted aqueous solution substantially free of insolubles into intimate contact with an oxygenating gas and
   d. recirculating the regenerated aqueous solution for reaction with the gas stream as in step a).

2. The method for reducing pollutant content as recited in claim 1 wherein the gas stream is gasified coal.

3. The method for reducing pollutant content as recited in claim 1 wherein the pollutant is hydrogen sulfide and sulfur is the insoluble generated.

4. The method for reducing pollutant content as recited in claim 1 wherein the gas stream contains mercaptan pollutant and the insolubles are organic disulfides.

5. The method for reducing pollutant content as recited in claim 1 wherein the oxygenating gas is air.

6. The method for reducing pollutant content as recited in claim 1 wherein the pH is in the range from pH 9.0 to pH 10.0.

7. The method for reducing pollutant content as recited in claim 1 wherein the EDTA to Fe ratio is in range of from about 1.25:1 to about 1.5:1.

8. The method for reducing pollutant content as recited in claim 7 wherein the concentration of iron ranges from about 0.5 moles per liter to about 1.0 mole per liter.

9. The method for reducing pollutant content of a gas stream as recited in claim 1 wherein contact between a gas stream containing hydrogen sulfide and the aqueous solution is by countercurrent flow in a first apparatus, sulfur is removed from the reacted aqueous solution and then contact between the substantially sulfur-free reacted aqueous solution and the oxygenating gas is by countercurrent flow in a second apparatus.

* * * * *